March 21, 1950     H. A. (MONT) DAVIDSON     2,501,642
COLLAPSIBLE POULTRY CRATE Filed July 23, 1947     3 Sheets-Sheet 1

INVENTOR.
Harry A. (Mont) Davidson
BY Frederick J. Hardman
his attorney

March 21, 1950  H. A. (MONT) DAVIDSON  2,501,642
COLLAPSIBLE POULTRY CRATE
Filed July 23, 1947  3 Sheets-Sheet 3
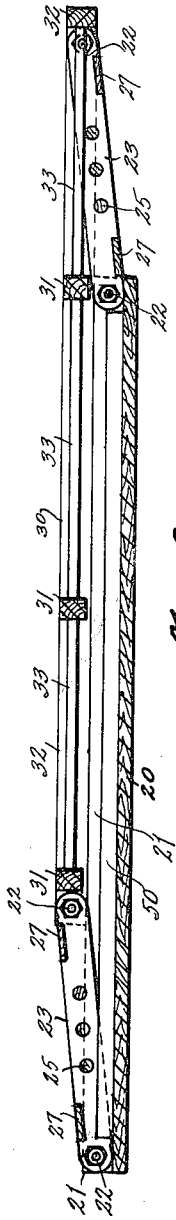
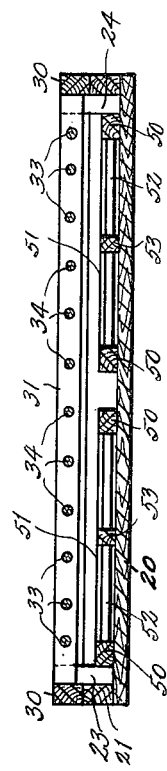
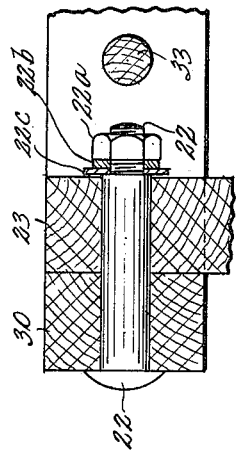
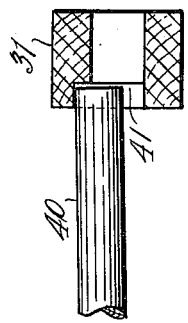
INVENTOR.
Harry A. (Mont) Davidson
BY
Frederick J. Hardman
his attorney.

Patented Mar. 21, 1950

2,501,642

UNITED STATES PATENT OFFICE 2,501,642

COLLAPSIBLE POULTRY CRATE

Harry A. (Mont) Davidson, Detroit, Mich.

Application July 23, 1947, Serial No. 762,971

2 Claims. (Cl. 217—47)

This invention relates to crates for transporting live poultry, generally by trucks. The poultry crate is preferably the rod type meaning that the frames, or panels which are supported by a solid bottom and form the sides, ends and top of the crate, support parallel rods spaced to form a cage which provides ample ventilation and permits feeding the poultry in transit from troughs hung on the side panels. The birds in the crate have ready access to food and water in the troughs since the side panels particularly include vertically disposed parallel rods between which the birds can pass their heads. The top panel provides an opening through which the birds are passed into the crate, and the opening is closed by a rod-type sliding door which is latched in closed position.

The transportation of empty crates from the market back to the poultry farm has been an economic problem on account of the bulk of the crates. I am informed that crates other than the rod-type have been made collapsible in order to occupy less space on the return trip, but I am not aware of the existence of a collapsible rod-type poultry crate.

It is therefore an object of my invention to provide a collapsible crate having features which are adapted for rod-type construction as well as other types of construction. This object is accomplished in the disclosed embodiment of my invention by a construction in which the side and end panels are pivotally connected with the crate bottom and the top panel is pivotally connected with the end panels, the arrangement being such that the crate can be easily collapsed while the parts remain connected to each other so as to occupy space which is substantially less than the space requirements of the erected crate. My crate, when collapsed, occupies vertically less than one-fourth the vertical space occupied when erected. In this connection, it is a further object of my invention to provide a sturdy construction whereby the lowermost crate in a stack of these crates filled with poultry will easily carry the load of the crates supported by it.

Further objects and advantages of the present invention will be apparent from the following description of a preferred embodiment thereof, reference being made to the accompanying drawings.

Figure 1:
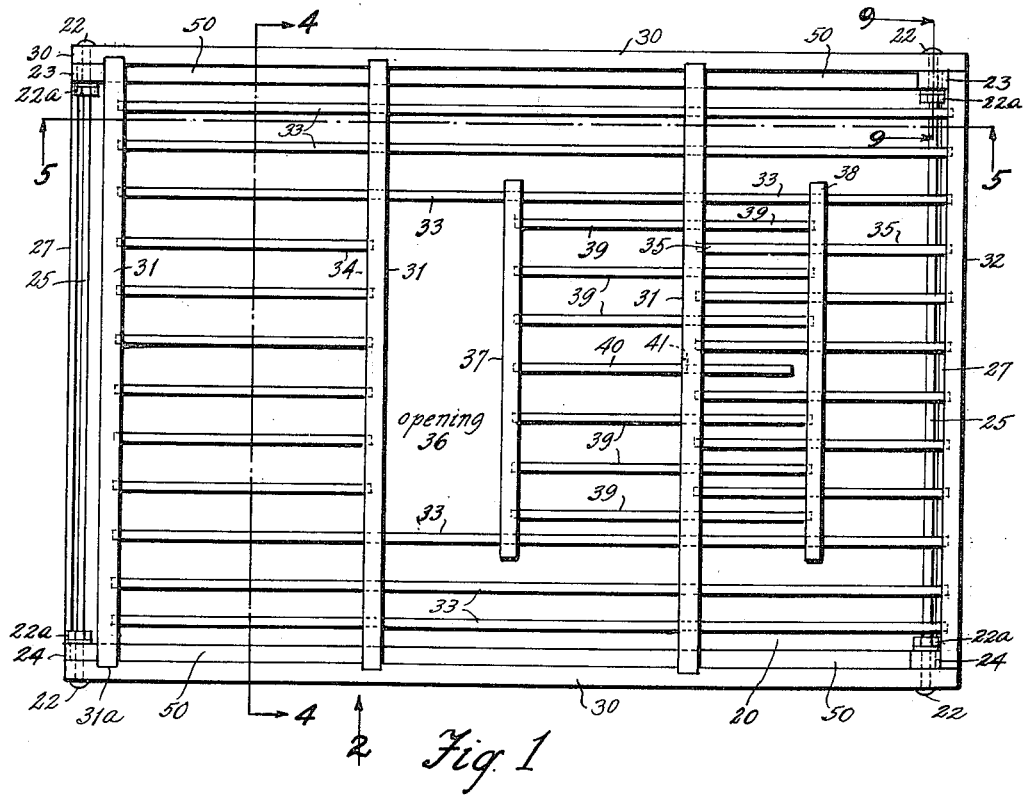
Fig. 1 is a plan view of the crate.
Figure 4:
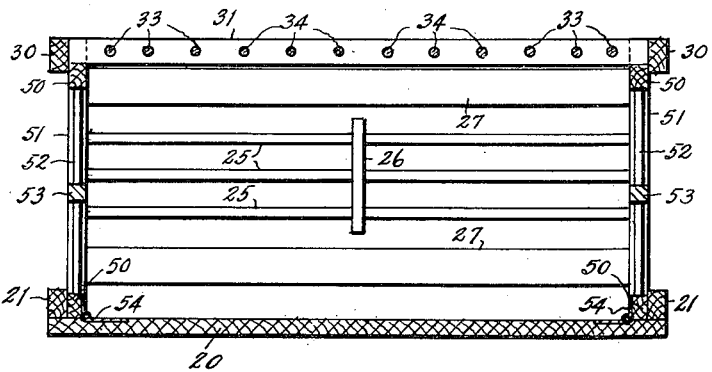
Figure 5:
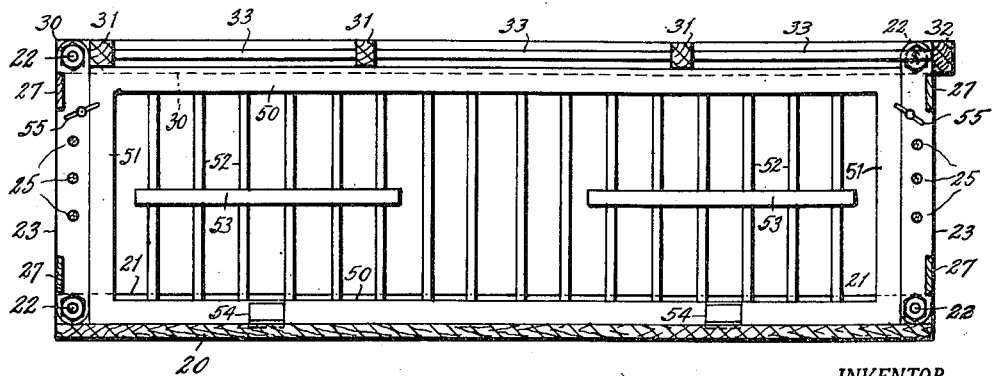

Figs. 4 and 5 are sectional views respectively on lines 4—4 and 5—5 of Fig. 1.

Fig. 6 is a longitudinal sectional view of the crate when collapsed.

Fig. 7 is a transverse sectional view of the crate when collapsed.

Fig. 8 is a fragmentary sectional view on a larger scale showing the free end of a latch rod of the sliding door of the top panel of the crate, when the door is closed and the latch rod is in door-latching position.

Fig. 9 is a fragmentary view on a larger scale on line 9—9 of Fig. 1.

Figure 3:
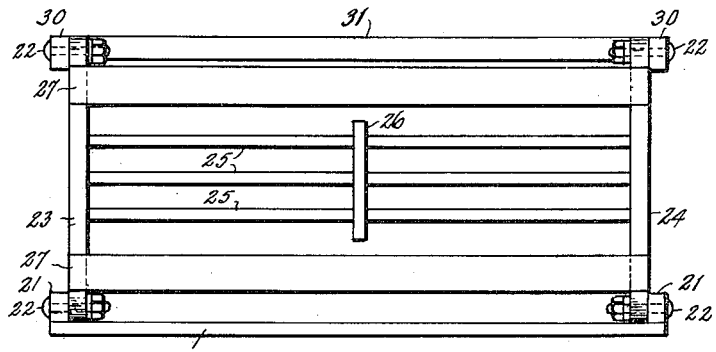
Fig. 3 is an end view looking in the direction of arrow 3 of Fig. 2.

The crate has a solid bottom member 20 made of relatively thin wood, one-half inch thick for example. The bottom is reenforced at its side edges by bars 21 which for example are 1¼" wide or high and ¾" thick. Near the ends of the bars 21, they are bored to receive bolts 22 (Fig. 3) which pass through corner posts 23 and 24 of the end panels.

Each end panel comprises a pair of corner posts 23 and 24 and connecting slots 27 and rods 25 which are set into the posts and which pass through a stiffener strip 26. The pair of corner posts 23 and 24 at each end of the crate support slats 27 and rods 25 which are set into the posts and which pass through a stiffener strip 26. The parts 23 and 27, when assembled, form an end panel.

The frame of the top panel is formed of two side bars 30 pivotally connected with end panel posts 23 and 24 by bolts 22. Bars 30 for example are 1¼" wide or high and ¾" thick, and three cross-bars 31 1" wide or high and ¾" thick, and a cross bar 32 1¼" wide or high and ¾" thick. The bars 31 are set into the bars 30 as indicated at 31a (Fig. 1) and the bar 32 is connected with bars 30 by suitable mortise joints. The upper surfaces of the bars 31 and 32 are flush with the upper surfaces of the bars 30. Consequently, the bottom surfaces of the bars 31 are above the bottom surfaces of the bars 30 as shown in Fig. 4.

Rods 33 are set into left bar 31 and pass through the other bars 31 and are set into bar 32. Short rods 34 are set into bars 31 at the left portion (Fig. 1) of the top panel. Short rods 35 are set into bars 31 and 32 of the right portion of the top panel. Between the intermediate bars 31, an opening 36 can be provided for passing poultry into the crate. This opening can be made wider than shown in Fig. 1 or can be fully closed by a sliding gate comprising a bar 37 which slides on two rods 33, a bar 38 which slides on the same two rods 33 and on the rods 35 that are between them, and comprising rods 39 set into the bar 37 and 38 and passing through holes in the right hand intermediate bar 31 and comprising a latch rod 40 attached only to bar 37 and biased laterally (upwardly in Fig. 1) so as to snap into a latching recess 41 when the door is closed as shown in Fig. 8.

The construction of the pivotal connections provided by bolts 22 is shown on a larger scale in Fig. 9. Each bolt 22 has a shoulder for receiving a plain washer 22c against which a lock washer 22b is forced by a nut 22a tightened on the bolt 22. The washer 22c is spaced by the bolt shoulder slightly from the side bars of the bottom or top panels. (Fig. 9 shows a side bar 30 of the top panel.) Thus the end panel side posts are not clamped by the plane washers.

When the crate is erect as shown in Fig. 5, the upper portions of the corner posts of the right end panel engage the inner surface of top panel cross bar 32 which overhangs the right end of bottom 20 a distance equal to the horizontal thickness of said bar 32, and the upper portions of the corner posts of the left end panel engage the outer surface of the left-most cross bar 31 of the top panel which is set in from the vertical plane of the left end surface of the bottom a distance equal to the width of the corner posts of the left end panel. These engagements prevent pivotal movement of the end panels from collapsed position past erect or vertical position.

Figure 2:
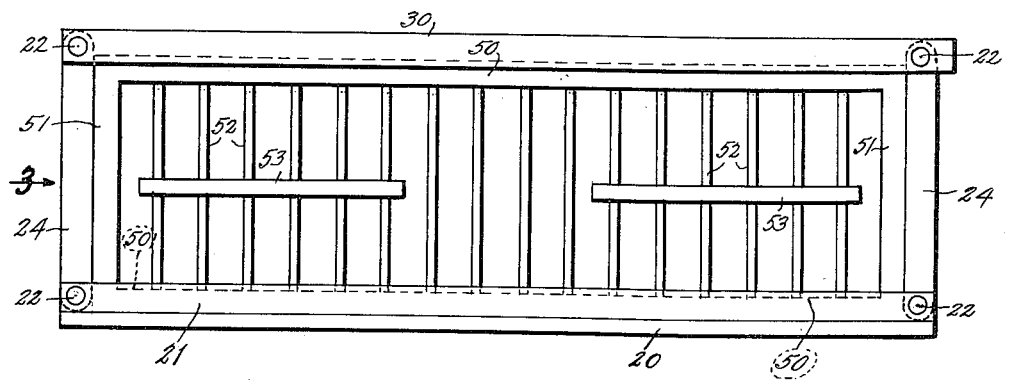
Fig. 2 is a side view looking in the direction of arrow 2 of Fig. 1.

The side panels, like the end panels, are alike. Each side panel comprises top and bottom frame bars 50 and end frame bars 51 connected by suitable mortise joints. Vertical rods 52 are set into the bars 50 and certain ones of them pass through stiffening bars 53 as shown in Fig. 2. The side panels are pivotally connected with the bottom 20 by hinges 54 one leaf of each of which is attached to the bottom 20 and the other leaf to a lower bar 50 of a side panel. When the side panels are upright, the lower bar 50 of each is against a side bar 21 of the bottom 20 and the upper bar 50 of each is against that portion of a side bar 30 of the top panel which is below the bottom surfaces of the cross bars 31 of the top panel. The top surface of the top bar 50 of each side panel is directly under the cross bars 31 and can even engage the intermediate bars 31 by springing the top panel slightly as the side panels are turned to upright position. This construction provides for transmission of load upon the top panel to the bottom through the side panels as well as through the corner posts 23. Load upon the top bar 50 of a side panel is transmitted by the rods 52 as well as through the end bars 51 of the side panel to the bottom bar 50 of the side panel and thence to the bottom 20.

The length of each side panel is such that it fits snugly into the space between adjacent corner posts 23, when upright. Butterfly catches 55 pivotally supported by the posts 23, when turned into the positions shown in Fig. 5; retain the side panels in the planes of the posts which are adjacent to the side panels. In other words, each side panel is received within a frame comprising the two end panel corner posts adjacent the ends of the side panel, and comprising a portion of the bottom 20 and comprising end portions of the cross bars 31 of the top panel. This disposition of the side panels, when erect, prevents pivotal movement of the end panels from upright toward collapsed position. As stated before the upper portions of the corner posts of the end panels, when erect, are located in engagement with the end cross bars 31, 32 of the top panel. Therefore when the side panels are erect, each end panel corner posts is confined between a side panel and a top panel cross member. By such positioning of the end panel corner posts and the side panels, when the crate is erect, the crate is stiffened longitudinally. Since each side panel is retained against the bars 21 and 30 by the side panel hinges 54 and by the butterfly catches 55, the crate is stiffened transversely.

To collapse the crate, the butterfly catches 55 are turned to free the side panels which are folded down upon the bottom 20 as shown in Fig. 7; and the top panel is pushed down. The structure collapses parallelogram fashion with the top panel side bars 30 resting on the bottom side bars 21 as shown in Fig. 6. The two corner posts 23 at the left end of the crate are received in the spaces between the bottom bars 50 of the side panels, when folded down, and the side bars 21 of the bottom 20. Thus the collapsed structure is enclosed at the sides by the engaging side bars 21 and 30. The space requirements in a horizontal direction as viewed in Fig. 6 have been increased a distance about equal to the length of a corner post, but the space requirements in a vertical directon have been reduced substantially. For example, a crate which is about 12½" high when in use, will fold to 3" in height.

While the embodiment of the present invention as herein disclosed, constitutes a preferred form, it is to be understood that other forms might be adopted, all coming within the scope of the claims which follow.

I claim my invention to be the following:

1. A collapsible poultry crate comprising a rectangular bottom and bars secured to its upper side along its side edges, a rectangular top panel of substantially the same width as the bottom and comprising side bars parallel to the side bars of the bottom and spaced apart a distance equal to the spacing of the side bars of the bottom and comprising connecting cross bars one of which, when the crate is erect, overhangs the nearest end surface of the bottom a distance substantially equal to the horizontal thickness of said cross bar and the cross bar nearest the opposite end surface of the bottom being spaced inwardly from the vertical plane of said opposite end surface, cage members attached to the cross bars of the top panel, end panels of width to be received between the bottom side bars and the top panel side bars when the crate is collapsed, and each comprising two corner posts which are pivotally attached near their ends to the bottom side bars and to the top panel side bars, the posts of that end panel nearest to the first mentioned end surface of the bottom, when erect, engaging the inner vertical surface of the overhanging top panel cross-bar, and the posts of the other end panel, when erect, engaging the outer vertical surface of the top panel cross bar spaced inwardly from said vertical plane of said bottom end surface, said engagements of the posts with said top panel cross bars preventing pivotal movement of the end panels from collapsed position to a position past erect or vertical, cage members supported by the posts of the end panels, side panels each having a frame comprising top and bottom members and two side members in the same plane and having the bottom member hinged to the crate bottom and swinging on its hinges from a collapsed position upon the crate bottom to a vertical position in which it rests upon the bottom and in which it is located between posts of the end panels, the horizontal length of the side panel being substantially equal to the distance between the adjacent side panel posts when erect thereby preventing, when the side panels are erect, swinging movement of the end panels from erect position toward collapsed position, cage members supported by the side panels and means for retaining the side panels in erect position.

2. A collapsible poultry crate comprising a rectangular bottom and bars secured to the upper side of said bottom and along its side edges, a rectangular top panel of substantially the same width as the bottom and comprising side bars parallel to the side bars of the bottom and spaced apart a distance equal to the spacing of the side bars of the bottom and comprising connecting cross bars and cage members attached thereto, end panels of width to be received between the bottom side bars and the top panel side bars when the crate is collapsed and each comprising two corner posts which are pivotally attached near their ends to bottom side bars and to top side bars, and comprising cage members attached to the corner posts, said corner posts of the end panels being vertical when the crate is erect, there being a plurality of the cross-bars of the top panel which are located between the corner posts when the crate is erect and which have their lower surfaces located above the lower surfaces of the top panel side bars, and side panels comprising top and bottom frame members and two side members in the same plane, the length of each side panel being such as to be received, when the crate is erect, between two corner posts located at the same side of the crate and the width of each side panel being substantially equal to the vertical distance, when the crate is erect, between the top surface of the bottom and the lower surfaces of the top panel cross bars located between corner posts, hinges pivotally connecting each side panel with the bottom member and so located that each side panel can move from collapsed position upon the bottom to erect position in which the bottom member of each side panel rests directly upon the crate bottom and engages the inner vertical surface of a side bar of the crate bottom and in which each upper surface of the top member of the side panel engages the lower surfaces of those top-panel cross bars located between corner posts when erect and in which the outer vertical surface of the top member of each side panel engages the inner vertical surface of the adjacent top-panel side member, and vertically disposed cage members within the planes of the side surfaces of the bottom and top frame members of the side panels and connecting them for transmission of the load, which the top frame members of the side panels receive from cross bars of the top panel, to the bottom frame members of the side panels and thence to the crate bottom, and means for retaining the side panels in erect position.

HARRY A. (MONT) DAVIDSON.

REFERENCES CITED

The following references are of record in the file of this patent:

UNITED STATES PATENTS

| Number | Name | Date |
|---|---|---|
| 154,534 | Van Arnum | Aug. 25, 1874 |
| 753,228 | Bridgers | Mar. 1, 1904 |